(12) United States Patent
Grose

(10) Patent No.: US 11,725,972 B2
(45) Date of Patent: Aug. 15, 2023

(54) TANK FLUID LEVEL MEASUREMENT SYSTEMS AND METHODS

(71) Applicant: Dean Grose, Eighty Four, PA (US)

(72) Inventor: Dean Grose, Eighty Four, PA (US)

( * ) Notice: Subject to any disclaimer, the term of this patent is extended or adjusted under 35 U.S.C. 154(b) by 192 days.

(21) Appl. No.: 17/024,673

(22) Filed: Sep. 17, 2020

(65) Prior Publication Data
US 2021/0255020 A1 Aug. 19, 2021

Related U.S. Application Data

(60) Provisional application No. 63/034,945, filed on Jun. 4, 2020, provisional application No. 63/022,351, filed on May 8, 2020, provisional application No. 62/978,015, filed on Feb. 18, 2020.

(51) Int. Cl.
*G01F 22/00* (2006.01)
*B67D 7/22* (2010.01)
*G01F 23/284* (2006.01)

(52) U.S. Cl.
CPC ............. *G01F 22/00* (2013.01); *B67D 7/221* (2013.01); *G01F 23/2845* (2013.01)

(58) Field of Classification Search
CPC .... G01F 22/00; G01F 23/2845; G01F 23/802; B67D 7/221; B67D 7/02; B67D 7/04
See application file for complete search history.

(56) References Cited

U.S. PATENT DOCUMENTS

| 5,427,137 A | 6/1995 | Bowen | |
|---|---|---|---|
| 6,945,288 B1 * | 9/2005 | Brakefield | B67D 7/58 141/231 |
| 8,195,590 B1 * | 6/2012 | Coggins | G01F 23/80 706/14 |
| 9,080,529 B1 * | 7/2015 | Klughart | B60R 16/0236 |
| 2011/0174825 A1 * | 7/2011 | Griffin | A47J 37/1271 220/663 |
| 2012/0260729 A1 * | 10/2012 | Bayley | G01F 23/363 73/307 |
| 2014/0053645 A1 * | 2/2014 | Ward | G01F 23/14 73/302 |
| 2016/0115011 A1 * | 4/2016 | Daniels | B67D 7/04 222/56 |
| 2016/0116324 A1 * | 4/2016 | Job | G01F 23/804 73/290 V |

FOREIGN PATENT DOCUMENTS

| CA | 2810380 A1 | 9/2014 | |
|---|---|---|---|
| JP | 2002181289 A | 6/2002 | |
| WO | WO-2020060575 A1 * | 3/2020 | ....... B60K 15/03006 |

* cited by examiner

*Primary Examiner* — David Z Huang
(74) *Attorney, Agent, or Firm* — Richard W. James

(57) ABSTRACT

A tank volume measurement system and method. The tank volume measurement system receives a tank identifier indicating which tank the level sensor is sensing, receives a tank level indication from a level sensor, correlates the tank level to a tank volume using a calibrated strapping chart, and outputs a volume indication to a user.

20 Claims, 5 Drawing Sheets

Table of liquid level vs. volume in tank

TANK FLUID LEVEL MEASUREMENT SYSTEMS AND METHODS

CROSS-REFERENCE TO RELATED APPLICATIONS

The present application claims priority to U.S. Provisional Patent Application No. 62/978,015, filed Feb. 18, 2020, which is incorporated herein in its entirety, U.S. Provisional Patent Application No. 63/022,351, filed May 8, 2020, which is incorporated herein in its entirety, and U.S. Provisional Patent Application No. 63/034,945, filed Jun. 4, 2020, which is incorporated herein in its entirety.

BACKGROUND

Field of the Disclosure

The present disclosure relates generally to tanker truck fluid level measurement systems and methods. The systems and methods may include management capabilities related to filling, draining, and transport of fluids.

Description of the Related Art

Tanker trucks do not currently have an effective way of measuring the amount of fluid that is in a tank of a tanker truck. One method of measuring the fluid in a tanker is by placing the truck on a scale when it is empty and again when it is full and determining how many gallons are in the tank by weight and specific gravity of the fluid. Weighing trucks in certain industries, including the oil and gas industry, is seldom used, however, at least because the weight of fluids can vary greatly and because it is impracticable to put a scale at every gas and oil extraction site, such as drill pads.

Other methods of measuring fluid in a tank are through the use of level gauges and monitoring systems. Those systems are very inaccurate and do not reflect the correct quantity of liquid being hauled, however. Tanks on trucks are typically manufactured with inherent variability, often due to inconsistency in the raw materials used to manufacture the tank. The volume of each tank varies from one tank to the next even though they may be labeled the same container size. The same tank often varies +/−3-5% in volume due to manufacturing differences. Moreover, tanker trucks that desire to measure fluid level currently use several different types of gauges and monitoring systems. All of those systems provide an approximation of volume and do not accurately measure the tank liquid volume or take into account inaccuracies, such as tank manufacturing variances. Thus, the volumes of tanker truck tanks commonly differ from 10-15% when measured by various existing methods. Measuring systems that assume that all tanks are equivalent likely do not account for tank discrepancies and imbedded assumptions, such as equivalent tank capacities, ripple through existing measuring systems resulting in inaccurate tank level measurement.

Another method used to determine fluid volume in a tanker truck is to measure the volume of fluid placed into the tank when it is filled. When such a method is employed, a flow meter may measure the volume of liquid being placed in the tank. This volume measurement method is sometimes used in industries such as hauling gasoline and chemicals.

The use of flow meters to measure the volume of fluid placed into or removed from a tank is not practical in certain industries, either, because, for example, it may be expensive, time consuming, or otherwise impractical to include a flow meter at each extraction site to monitor fluid flow into or out of a truck.

Truck monitoring gauges are also employed in known systems. Those gauges use an interior float to measure fluid level. Those gauges are also inaccurate, however, because the float changes the level of the fluid itself and variances in fluid specific gravity and varying tank dimensions contribute to error.

Yet another volume measurement system uses an external sight glass to determine fluid level in a tank, however sight glasses only provide level approximations and do not provide an output capable of being utilized by an asset monitoring system or program.

For at least the foregoing reasons, it is desirable to have an improved tanker truck fluid level measurement system.

It is also desirable to have an improved tanker truck fluid volume measurement system.

It would also be advantageous to include fluid transfer management capabilities in a tank filling or draining system.

In addition, it would be advantageous to identify the location of a tanker truck that is filling or draining.

It would also be advantageous to have a system for creating a custom strap chart for a specific tanker truck.

It would also be advantageous to have a user interface to receive information from the measurement systems discussed herein.

It would also be beneficial to have indictors that indicate to an operator when a truck tank is nearly full and when the truck tank is full.

It would be beneficial to automatically shut-off flow to a tank when that tank is nearly full.

A measurement system that controls an amount of pressure applied to a tank based on the level of fluid in the tank or the volume of fluid in the tank would also be beneficial.

Accordingly, the present invention provides solutions to the shortcomings of prior tanker truck filling and draining systems, apparatuses, and methods. Those of ordinary skill in the art will readily appreciate, therefore, that those and other details, features, and advantages of the present invention will become further apparent in the following detailed description of the preferred embodiments of the invention.

BRIEF DESCRIPTION OF THE DRAWINGS

The above-mentioned and other features and advantages of this disclosure, and the manner of attaining them, will become more apparent and the disclosure itself will be better understood by reference to the following descriptions of embodiments of the disclosure taken in conjunction with the accompanying drawings, wherein.

SUMMARY OF THE INVENTION

Figure 1:
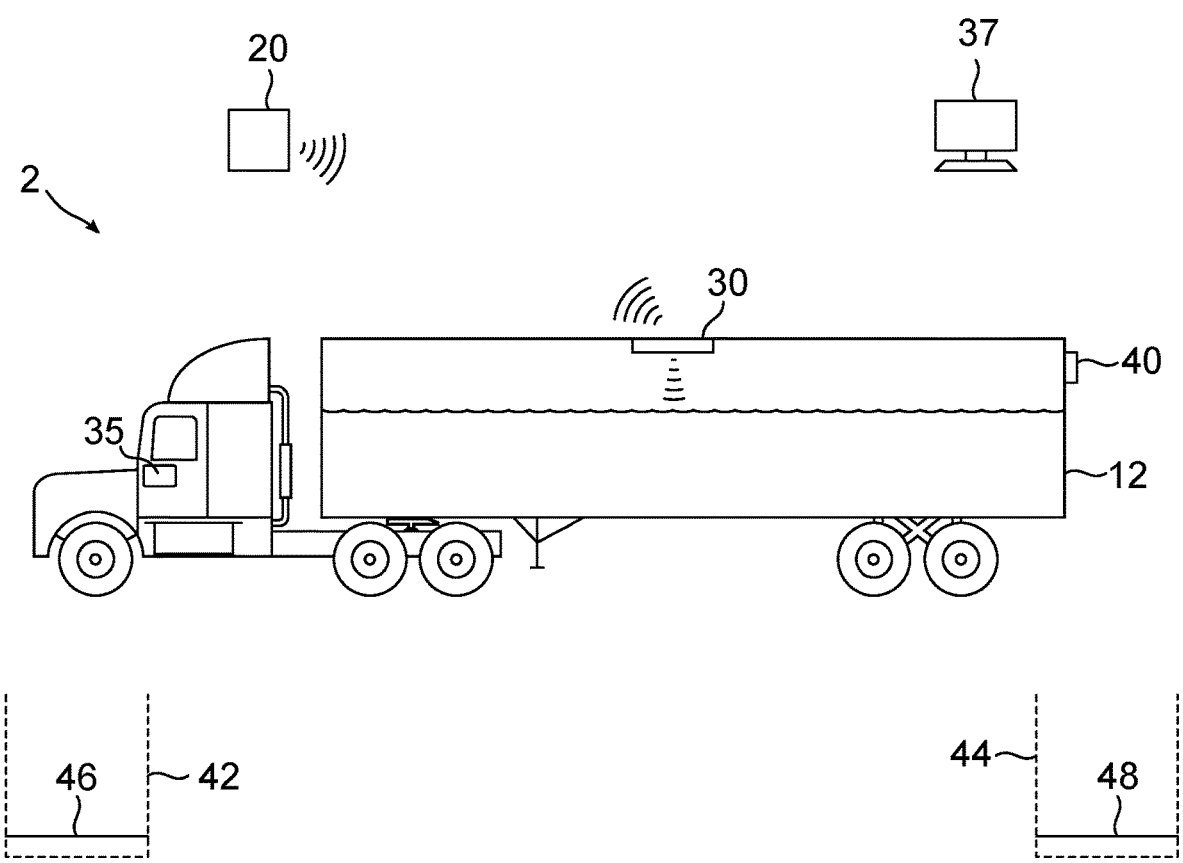
FIG. 1 is a simplified view of a tanker truck fluid level measurement system with location sensing and fluid transfer management capabilities, in accordance with one embodiment of the disclosed invention.

In an embodiment, a tanker truck volume measurement system includes a processor having access to a plurality of strap charts and coupled to a level sensor. One strap chart exists for every tank in which fluid volume is to be measured and each strap chart correlates a level of fluid in a particular tank to a volume of fluid held by that tank at that level. The level sensor is mounted adjacent to the tank currently being loaded or unloaded and may be removable for use on various tanks. The processor includes instruction which, when executed by the processor, cause the processor to receive a tank identifier indicating which tank the level sensor is sensing, receive a tank level indication from the level sensor, correlate the tank level to a tank volume using the strap chart for the tank having its level sensed, and output the volume that correlates to the sensed level in that tank, making that volume accessible to a user.

In another embodiment, a tanker truck volume measurement system that includes a processor having access to a plurality of strap charts and coupled to a level sensor receives a unique identifier for a tank in position to be filled, receives periodic fluid level measurements in the tank, and correlates the level of fluid in the tank to a volume of fluid in the tank by referencing a strap chart prepared for the specific tank having its level. The processor then provides indicators to assist the tank truck operator in knowing when the tank is full, empty or at a desired level. Those indicators include a first indicator that indicates when the tank is less than full by a volume of a fill hose and a second indicator that indicates when the tank is full. In an embodiment, the indicators may include illuminating different colored lights and sounding an audible indicator.

A method of operating a latch is also provided. That method includes receiving an identifier for a tank, receiving a level of fluid in the tank, correlating the level of fluid to a volume of fluid using a strap chart prepared for the specific tank having its level sensed, and outputting the volume that correlates to the sensed level in that tank.

Other embodiments, which may include one or more portions of the aforementioned apparatuses and methods or other parts or elements, are also contemplated, and may have a broader or different scope than the aforementioned apparatuses and methods. Thus, the embodiments in this Summary of the Invention are mere examples, and are not intended to limit or define the scope of the invention or claims.

DETAILED DESCRIPTION

The following description is provided to enable those skilled in the art to make and use the described embodiments contemplated for carrying out the concept. Various modifications, equivalents, variations, and alternatives, however, will remain readily apparent to those skilled in the art. Any and all such modifications, variations, equivalents, and alternatives are intended to fall within the spirit and scope of the present concept.

For purposes of the description hereinafter, the terms "upper," "lower," "right," "left," "vertical," "horizontal," "top," "bottom," "lateral," "longitudinal," and derivatives thereof shall relate to the concept as it is oriented in the drawing figures. However, it is to be understood that the concept may assume various alternative variations, except where expressly specified to the contrary. It is also to be understood that the specific devices illustrated in the attached drawings, and described in the following specification, are simply exemplary embodiments of the concept. Hence, specific dimensions and other physical characteristics related to the embodiments disclosed herein are not to be considered as limiting.

As employed herein, the term "number" shall mean one or an integer greater than one (e.g., a plurality).

Any reference in the specification to "one embodiment," "a certain embodiment," or a similar reference to an embodiment is intended to indicate that a particular feature, structure or characteristic described in connection with the embodiment is included in at least one embodiment of the invention. The appearances of such terms in various places in the specification do not necessarily all refer to the same embodiment. References to "or" are furthermore intended as inclusive, so "or" may indicate one or another of the ored terms or more than one ored term.

FIG. 1 illustrates a tanker truck fluid level measurement system 2 with management capabilities, in accordance with one non-limiting embodiment of the disclosed tank management system. The tanker truck fluid level measurement system 2 includes a tanker truck 10 having a tank 12 and a level sensor 30 mounted adjacent to the tank. A processor-based device 20 communicates with the level sensor 30. The processor-based device 20 may be coupled to the level sensor 30 by wires or wirelessly. The truck 10 in this embodiment also includes a global positioning device 40, which may determine the relationship of the truck 10 to various gas or oil sites or drill pads 46 and 48, possibly using geofencing technology 42 and 44 arranged to identify those sites 46 and 48.

The processor-based device 20 may be a general-purpose computer; a tablet; a mobile smartphone, referred to herein as a phone; an application specific user interface device; or another device that can be used to transfer information to the tanker truck fluid level measurement system 2 or receive information from the tanker truck fluid level measurement system 2.

The level sensor 30 may be any desired level measuring device, including, for example, a radar level sensor discussed herein, a float type level sensor, a capacitive type level sensor, a sensor that converts pressure into level, or any other type of sensor desired. The level sensor 30 may be mounted adjacent to the tank, for example a radar sensor mounted in or near the top or the tank 12, a pressure sensor mounted in the bottom of the tank, or a float sensor mounted in a tube in fluid communication with the tank 12. Moreover, the level sensor 30 may be permanently attached to the tank 12 or may be removable from the tank 12 for use on another tank 12 or reuse on the same tank 12 at another time.

In an embodiment, the level sensor 30, is a radar-based device and is mounted inside the top of the tank 12. The radar device level measuring device may have an accuracy of 2 mm or 0.08", and may be mounted internally near the top of the tank 12 and near the center of the tank 12. Such a radar device may utilize 80 GHz radar, so that the radar device is small, compact, and light (possibly approximately 1.4 lbs.). The radar device may be center mounted underneath a main hatch of the tank 12 for protection. The radar device may point down into the tank 12 and shoot a radar beam to measure the liquid level height. The radar device may be advantageous because it may be extremely accurate in terms of providing the level of the liquid height in the tank 12.

Figure 2:
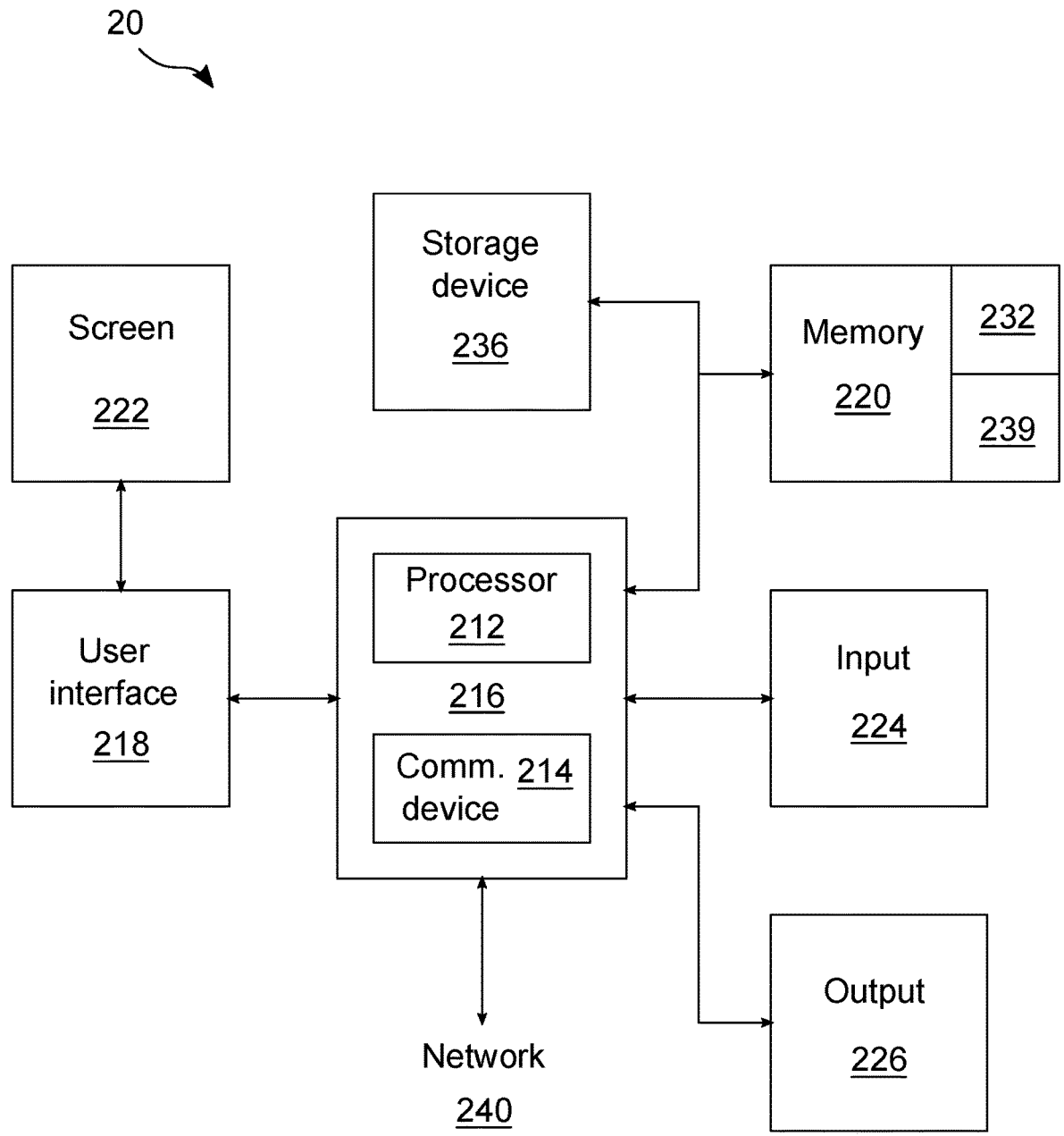
FIG. 2 illustrates an embodiment of a processor-based device to perform aspects of the methods and systems disclosed herein.

FIG. 2 illustrates an embodiment of the processor-based device 20. In that embodiment, the processor-based device 20 includes a processor 212 and a communication device 214. The processor 20 and communication device 214 can be combined in a microprocessor or other device and other components (e.g., 220 and 236) may also be included in such a microprocessor or other device.

The communication device 214 may be wired to a device to which it communicates; the communication device 214 may wirelessly communicate with one or more other devices over a network 240; which may be a wireless network, such as a mobile smartphone network; and the communication device 214 may operate both wired and wirelessly. The processor-based device 20 may furthermore include memory 220, an input 224 that may receive an input signal, such as a signal transmitted by a sensor, and an output 226 that may transmit a control signal, instruction, or data to another device, such as a valve actuator or other controlled device. The output device may alternatively or in addition provide a reading, for example a current volume of fluid in the tank 12, which may be mounted on or near a tank 12 that is being loaded or unloaded.

The processor-based device 20 may also be coupled to a user interface 218 to receive one or more signals from, for example, one or more of a keyboard, touch screen 222, mouse, microphone or other input device or technology and may have associated software. The user interface may also transmit information to, for example, a printer or screen 222 coupled to the user interface 218 or the output 226.

The memory 220 may, for example, include random-access memory (RAM), flash RAM, dynamic RAM, or read only memory (ROM) (e.g., programmable ROM, erasable programmable ROM, or electronically erasable programmable ROM) and may store computer program instructions and information. In embodiments, the memory 220 may be partitioned into sections including an operating system partition 232 where system operating instructions are stored, and a data partition 239 in which data, such as one or more strap charts 300 is stored.

The storage device 236 may include a memory device or a data storage device or a combination of both memory and data storage devices, or another device or devices for storage of data. The data storage 236 may be considered local storage when the data is stored directly on the processor-based device 20 or the data may be accessible to the processor-based device 20 over a wired or a wireless network. The storage device 236 may furthermore include a computer readable storage medium that includes code executable by the processor 212 of the tanker truck fluid level measurement system 2 that causes the processor 212 to, at least in part, perform as disclosed herein.

In an embodiment, the storage for the processor-based device 20 may include a combination of flash storage and RAM. The storage may include a computer readable storage medium and may include code executable by the processor 212.

In an embodiment, the elements, including the processor 212, communication adaptor 218, memory 220, input device 224, output device 226, and data storage device 236 may communicate by way of one or more communication busses 230. Those busses 230 may include, for example, a system bus or a peripheral component interface bus.

The processor 212 may be any desired processor and may be a part of a controller 16, such as a microcontroller, may be part of or incorporated into another device, or may be a separate device. The processor 212 may, for example, be an Intel® manufactured processor or another processor manufactured by, for example, AMD®, DEC®, or Oracle®. The processor 212 may furthermore execute the program instructions and process the data stored in the memory 220. In one embodiment, the instructions are stored in the memory 220 in a compressed or encrypted format. As used herein the phrase, "executed by a processor," is intended to encompass instructions stored in a compressed or encrypted format, as well as instructions that may be compiled or installed by an installer before being executed by the processor 212.

The data storage device 236 may be, for example, non-volatile battery backed static random-access memory (RAM), a magnetic disk (e.g., hard drive), optical disk (e.g., CD-ROM) or any other device or signal that can store digital information. The data storage device 236 may furthermore have an associated real-time clock, which may be associated with the data storage device 236 directly or through the processor 212. The real-time clock may trigger data from the data storage device 236 to be sent to the processor 212, for example, when the processor 212 polls the data storage device 236. Data from the data storage device 236 that is to be sent across the network 240 through the processor 212 may be sent in the form of messages in packets if desired. Those messages may furthermore be queued in or by the processor 212.

Figure 4:
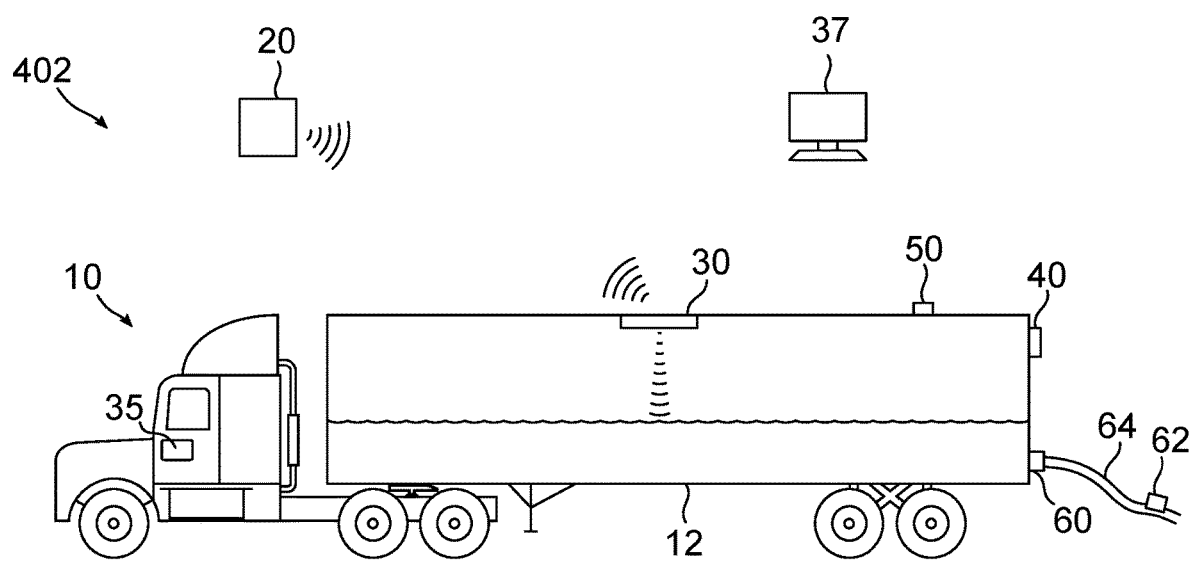
FIG. 4 illustrates an embodiment of a tanker truck fluid level measurement system with management capabilities that includes a tank fill indicator package.

The communication adaptor 218 permits communication between the processor-based device 20 and other nodes, such as a tanker truck controller 35, which may be associated with the level sensor 30, or a remote monitoring peripheral computer 37 or server, both illustrated in FIG. 4. The communication adaptor 218 may be a network interface that transfers information from a node such as a networked device, which would include an actuating device such as valve 60 or a sensing device, such as level sensor 30, the tanker truck controller 35, the remote monitoring peripheral computer 37, a general purpose computer (not illustrated), a user interface device, such as the processor-based device 20 depicted in FIGS. 1 and 2, or another node. The communication adaptor 218 may be an Ethernet adaptor or another adaptor for another type of network communication. It will be recognized that the processor-based device 20 may alternately or in addition be coupled directly to one or more other devices through one or more input/output adaptors (not shown).

Figure 3:
FIG. 3 is a strap chart correlating fluid level and fluid volume for a tanker truck, such as the tanker truck illustrated in FIG. 1.

The processor 212 may contain in its memory 220 or data storage device 226, or may communicate with another node or data storage device to access, a plurality of strap charts 300, an example of which is illustrated in FIG. 3. The strap charts 300 may equate the level of fluid in a tank 12 to the volume of fluid in that tank 12, establishing a simple and accurate way to determine the volume of fluid in a tank 12. A separate strap 330 chart may exist for each of a variety of tanks 12 from which the processor-based device 210 receives information. For example, a first tanker truck 10 may include a tank 12 and a unique identifier may be associated with that tank 12 or the truck 10 on which the tank 10 is situated.

The tank identifier may be any unique identifier of the tank 12 or the truck 10 on which a particular tank 12 is mounted and may be recognized in a variety of ways. For example, a user interface may be used to identify the tank currently in position to operate (e.g., load or unload), may be transmitted by the tank 12 or associated truck 10 by any signal transmitting device, or may be read and transmitted by a geofencing 42, 44 or other position determination device that senses the presence of the tank 12 or its associated truck 10.

Because of the variances that may occur through manufacturing, use, and damage, for example, to each tank 12 on each truck 10, the volume of a variety of tanks 12, potentially every tank 12, at various levels may be desired to be determined. To provide the volume of the liquid in the tank 12, each tank 12 may be separately calibrated. Such calibration may use a calibration pump skid and each calibration pump skid may utilize a flowmeter 62 (illustrated in FIG. 4) to measure an amount of fluid placed in the tank 12. The amount of fluid placed in the tank 12 may be associated with a level of the fluid in the tank 12 to create a strap chart 220 for that tank that provides the volume of fluid in the tank 12 as an output to a user or device when the level of fluid in the tank is provided as an input by a user or device. For example, in one embodiment, the level of the fluid may be measured each time a barrel of fluid is placed in the tank 12 and the volume of fluid that has been placed in the tank 12 may be associated with the current fluid level in the tank 12 in a table or strap chart 300 so that the number of barrels of fluid in the tank 12 may thereafter be determined by reading from the strap chart 300 the volume that corresponds to the fluid level in the tank 12.

In one embodiment, the flowmeter 62 may be a National Institute of Standards and Technology (NIST) certified calibrated flowmeter that is calibrated to be accurate to 0.02%. That flowmeter 62 may be employed to achieve an accuracy of + or − less than 10 gallons and may be accurate to 1 gallon in a nominal 110 bbl tank. The strap chart 300 may be established in the processor-based device 20 in the form of a two-dimensional array or other database format. The calibrated accuracy of the combined flow meter 62 and strap chart 300 can be correlated to the overall accuracy of the level system, creating a calibrated level system by proxy.

It may furthermore be noted that water may, for example, be placed in the tank 12 to create the strap chart 330, but any liquid may thereafter be placed in the tank 12 and the volume of the tank 12 may be measured using a level sensor 30 and the strap chart 300. Fluids that may be measured in the tank using the disclosed system may include, but are not limited to, oil, gasoline, water, milk, water mixed with various other solids and liquids, or any other fluid or other substance that may be transported via a tank.

The custom calibrating pump skid disclosed herein may be used when filling the tank 12 during a calibration phase. At the same time the tank 12 is being filled, the radar or other level measuring device 30 will measure the liquid level in the tank 12 and the processor-based device 20 can develop a custom strap chart 300 for the tank 12 as the liquid is placed into the tank 12.

FIG. 3 illustrates a level vs. volume table 300, also called a strap chart, for a particular tank 12. The strap chart 300 may thereafter be used for level/volume correspondence for that tank 12 for the life of that tank 12 or until a modification is made to that tank 12. Similarly, other tanks 12 could be calibrated on the pump skid and have custom strap charts 300 attached to them for use throughout the life of those tanks 12. Accordingly, in the future, when the level device 30 reads the liquid level, it may compare the level sensed to the custom strap chart 300 for that tank 12 and identify the exact volume of liquid in the tank 12 from the level of the fluid in that tank 12. In that way, variations in tank manufacturing are advantageously irrelevant due to use of the custom strap chart 300 developed for each tank 12. Furthermore, the tank calibration is performed independent of the type of liquid in the tank 12, as chemical composition does not impact the readings or volume.

In an embodiment, a plurality of strap charts 300 is accessible by the processor-based device 20, one strap chart 300 existing for every tank 12 in which fluid volume is to be measured. Each strap chart 300 correlates a level of fluid in a particular tank 12 to a volume of fluid held by that tank 12 at that level.

FIG. 4 illustrates another embodiment of a tanker truck volume monitoring system 402. The tanker truck fluid level measurement system 402 includes a tanker truck 10 having a tank 12, a transfer hose 64 that can carry fluid either to the tank 12 or away from the tank 12, a processor-based device 20, a level sensor 30, an indicator 40, a breather valve 50, and a fluid valve 60. The volume monitoring system of FIG. 4 includes an indicator package to assist an operator in filling the tank 12. In one embodiment, the system 402 contains an indicator package that includes two indicator lights that are used for an indicator 40 in this embodiment. The first light on the indicator 40 may illuminate when the tank 12 is almost full (e.g., 5 barrels less than full) and the second light on the indicator 40 may illuminate when the tank is full or very nearly full. The first light on the indicator 40 may, for example, be yellow and may be used to direct the operator to close a valve on a production tank from which the fluid is being pumped or otherwise transferred into the tank 12 of the truck 10. After stopping the flow of fluid from its source, the operator may empty a transfer hose 64 communicating between the fluid source and the tank 12 into the tank 12. For example, the operator may open a breather valve 50 on the tank 12 and drain the transfer hose 64 into the tank 12. The truck 10 may draw a vacuum during tank 12 filling and may continue to draw the vacuum when draining the transfer hose 64, thereby draining the fluid from the transfer hose 64 into the tank 12.

The second light on the indicator 40 may illuminate when the tank 12 is full or very nearly full. The operator may then cease placing fluid in the tank 12 and shut the production water valve 60 and the breather valve 50, thus yielding a full tank 12 of fluid. As such, the first and second lights on the indicator 40 advantageously assist the driver or other operator to know when to stop filling the tank 12 and shut the valve 60 on the tank 12 so the truck 10 is filled accurately and fully. Other light functionality may also or alternatively be included to indicate empty status or other important points in the filling or emptying process.

In an embodiment, various color indicator 40 lights turn on at the rear of the truck 10 during the filling operation to assist the driver or operator. A yellow light illuminates on the indicator 40 on when the truck is almost full (i.e., 5 bbls to full) and a red light illuminates on the indicator 40 to direct the driver to close the incoming production water valve 60. The operator then opens a ½" breather valve 50 on the tank 12 and empties the transfer hose 64 into the tank 12.

Truck 10 tanks 12 and the vessels they are loading from or unloading into may be pressurized to enhance that process. For example, when a truck 10 tank 12 is unloading, the tank 12 may be pressurized to assist in moving fluid out of the tank 12 or a vessel the tank 12 is unloading into may create a vacuum or negative pressure to assist in drawing the fluid out of the tank 12. Conversely, when the tank 12 is being loaded, a vessel providing fluid to the tank 12 may be pressurized to assist the fluid in moving from the vessel to the tank 12 or the tank 12 may draw a vacuum to assist in moving the fluid from the vessel to the tank 12. In various embodiments, the truck 10 may continue to operate and pull vacuum until the transfer hose 64 is empty to drain the fluid in the transfer hose 64 into the tank 12. The operator may then shut the production water valve 60 and should have a full load of fluid.

In embodiments, the level sensor may be used to adjust the pressure or vacuum applied to the tank 12 or the vessel. For example, when the tank 12 is draining, the volume monitoring system 402 may provide a signal to an apparatus pressurizing the tank 12 reducing the pressure applied in the tank 12 as the level or volume of the tank 12 is reduced. When the tank 12 is filling, the volume monitoring system 402 may provide a signal to an apparatus creating a vacuum in the tank to reduce the vacuum when the tank 12 nears full.

It should be recognized that any number of lights may be included on the indicator 40 to indicate fluid level in the tank 12 and thereby to assist the operator in filling the tank 12. It should furthermore be recognized that indicators 40 other than lights or in addition to lights may be employed. For example, an audible indicator may be employed to attract the attention of the operator and warn the operator that the tank 12 is nearing its full fill point. In certain embodiments, a combination of an audible indicator, a light indicator, and possibly other indicators are included in the system 2 indicator 40 to gain the attention of the operator when the tank is nearly full.

Furthermore, in accordance with the disclosed concept, the production water valve 60 may be automated to close-off flow to or from the tank 12 at a predetermined time associated with tank 12 level. Accordingly, the lighting package may operate as described hereinabove, and the automated valve 60 may automatically close when a pre-set tank 12 fill level is reached. Automatic closure of the production water valve 60 advantageously prevents the tank 12 from overfilling and scrubbing out.

A fill-level other than completely full for a tank 12 can alternatively be pre-set so that the production water valve 60 closes automatically when that preset level is reached, in embodiments in which a full tank 12 is not desired, for example when the truck 10 is to travel roads that do not permit the weight of a full tank 12 load of fluid. One example of when the aforementioned may be applied advantageously is where a 110 bbl truck is not permitted to carry 110 bbls of fluid to a particular location, such as a site in Ohio where a driver must carry no more than 64 bbls per load due to weight restrictions. In the past it has been difficult to determine if there were 64 bbls on the truck, but using the present fluid level measurement system, the driver or operator can pre-set 64 bbls to be transferred into the tank 12 and the automatic valve 60 will close when the tank 12 load reaches 64 bbls.

Where indicator 40 lights are used in such a less than full load embodiment, the first light on the indicator 40 may illuminate when the tank 12 is approximately 64 barrels less the volume of the transfer hose 64 so the operator can stop flow through the transfer hose 64 from the fluid source and empty the transfer hose 64 into the truck 10 tank 12 at that time. The second indicator 40 light may illuminate when the tank 12 is filled with 64 barrels of fluid to indicate that the tank 12 is full to the desired volume. In certain embodiments, the processor 212 may have stored or receive a quantity of fluid held by the transfer hose 64 and may determine when to indicate that fluid transfer should cease based on the difference between the capacity of the tank 12 and the capacity of the transfer hose 64.

In accordance with the disclosed system, the amount of fluid in the tank 12 can advantageously be determined with precision. Once that is known, reports can be generated for invoicing and billing purposes, regulatory reporting purposes, safety purposes (e.g., if the truck 10 would have an accident the responders will know exactly how much liquid is in the truck 10) and other desired purposes.

The level reading may be transmitted to one or more computerized devices for processing. For example, the level may be sensed by a level sensor 30 and the level may be transmitted electronically to a computerized device, such as the processor-based device 20, that uses the strap chart 302 for that tank 12 to determine the volume of fluid contained in the tank 12. In an embodiment, the level sensor 30 is a radar unit and the level is wirelessly transmitted via Bluetooth or another form of transmission to a level gauge located at the rear of the truck 10, a level gauge in the cab of the truck 10, or to an external user interface, such as a computer, a phone 20 shown in simplified form in FIG. 1, a tablet, or another electronic device. The processor-based device 20 may also receive the level from the level sensor 30 and generate volume data for the fluid for tracking purposes or other purposes. Regulatory reports, Bills of Lading, and other documentation may be automatically be generated from the processor-based device 20 or another device based on the information received and determined by the device 20 or another device. For example, the volume of water discharged at a site by each truck that discharged water at that site may be provided electronically or in printed form by the device 20

Alternatively, or in addition, the level sensor 30 may transmit to another device, an electronic signal that corresponds to an output signal provided by the level sensor 30, such as an electronic signal that corresponds to a 4-20 mA signal. In an embodiment, a wireless device, such as a Bluetooth device, is enabled to capture 4-20 mA signal from a radar-based level sensor 30 or another level sensing device. The radar-based level sensor 30 senses the level of the fluid in the tank 12 and transmits that level to the wireless device via a 4-20 mA signal. That signal is then referenced against the calibrated strap chart and the volume of fluid held in the tank 12 is produced, for example in gallons or barrels, from the level and the strap chart.

It is also contemplated herein that the system 2 may be employed with a number of geo-fences 200, 300, shown in simplified form in dashed line drawing in FIG. 1 to determine the location of the truck 10 when it loads or unloads. For example, reference numerals 210, 310 denote well pads configured to contain oil that the truck 10 will obtain. As shown, surrounding each well pad 210, 310 is a corresponding one of the geo-fences 200, 300, a virtual fence that may include GPS coordinates of the location of the well pads 210, 310. Additionally, as shown, the truck 10 may also have a GPS system 100, shown in simplified form and the location of the truck 10 may be determined from the GPS system 100. Using that system, when a truck 10 that arrives at well pad 210, the GPS system 100 will indicate that the truck 10 is on the geo-fence 200. Accordingly, when the truck 10 arrives at the geo-fence 200, the geo-fence 200 will advantageously be able to know that the truck 10 was previously at, for example, the geo-fence 300. This makes tracking the fluid in the truck 10 significantly easier. Once the fluid is moved to a new well pad 210, 310, the truck 10 is registered at the new geo-fence 200, 300, which is recorded for the specific truck. In this manner, the travel path and distribution or accumulation of the liquid in the tank 12 can be recorded and monitored.

Figure 5:
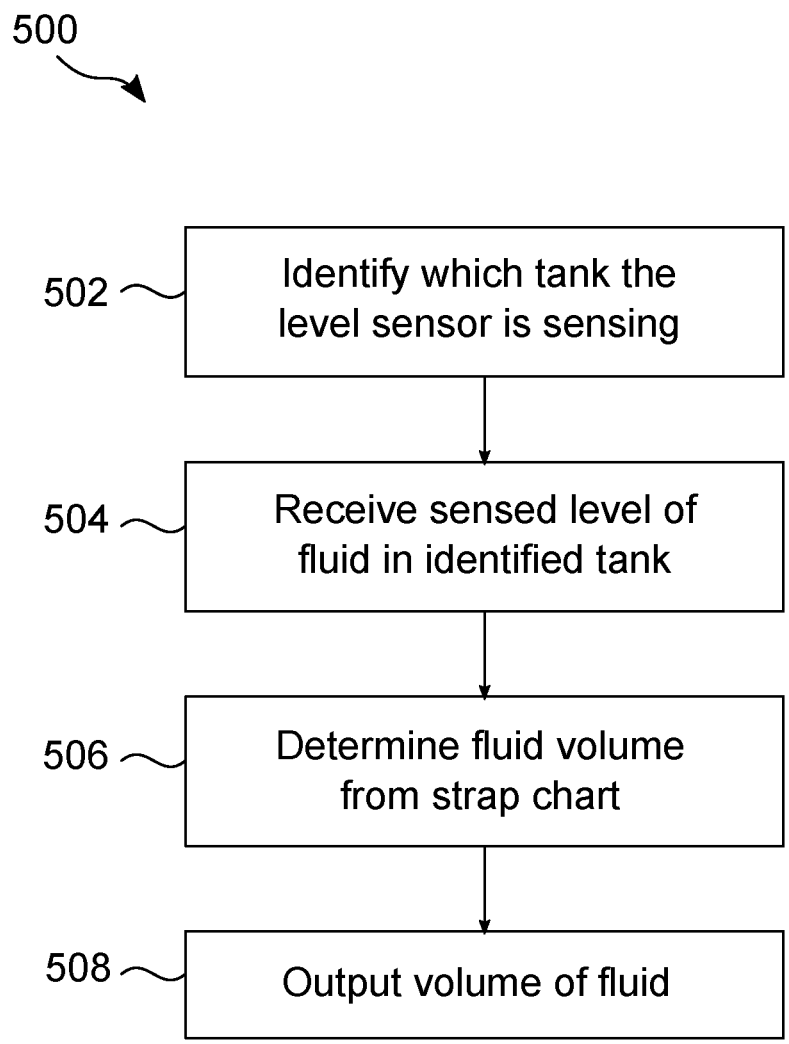
FIG. 5 illustrates a method of performing volume measurement.

FIG. 5 illustrates a method 500 of measuring the volume of a tanker truck 10 tank 12 performed by a processor 212. At 502, a tank identifier indicates to the processor 212 which tank 12 the level sensor 30 is sensing, the level sensor 30 providing a signal corresponding to the level of fluid in that identified tank 12. At 504, the level sensor 30 provides a signal to the processor 212 corresponding to the level of fluid in the identified tank 12 and the processor 212 receives that level signal. At 506, the processor 212 correlates the level of the fluid to a strap chart 300 for the identified tank 12, the strap chart 300 having been previously created and stored for access by the processor. At 508, the processor 212 provides an output representing the volume of fluid that corresponds to the level of fluid indicated for the tank 12, the volume correlating to level in the strap chart 300.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A tank volume alert system, comprising:
    a tank having a level sensor for sensing a level of fluid in the tank and a tank identification transmitter, the tank having a tank fluid volume capacity;
    a transfer hose having a transfer hose fluid volume capacity, that fluid volume capacity being a portion of the tank fluid volume capacity, the transfer hose to carry fluid into the tank; and
    a processor coupled to the level sensor, the processor including instructions which, when executed by the processor, cause the processor to:
        receive a tank identifier indicating which tank the level sensor is sensing from the tank identification transmitter;
        receive a tank level indication from the level sensor;
        correlate the tank level to a tank volume; and
        provide at least one of sounding an audible indicator and illuminating a light indicator when the tank volume is equal to the tank volume capacity less the transfer hose volume capacity.

2. The tank volume alert system of claim 1, wherein a breather valve is opened on the tank and then the transfer hose is drained into the tank.

3. The tank volume alert measurement system of claim 1, wherein a vacuum is drawn in the tank when draining the transfer hose, thereby draining fluid in the transfer hose from the transfer hose into the tank.

4. The tank volume alert system of claim 1 further comprising a user interface transmitting the tank identifier to the processor.

5. The tank volume alert system of claim 4, further comprising a communication adaptor coupled to the processor to receive the transmission from the user interface.

6. The tank volume alert system of claim 1, further comprising a communication adaptor coupled to the processor, the processor receiving a tank identifier transmitted by a truck on which the tank is mounted through the communication adaptor when the truck tank is one of loading and unloading.

7. The tank volume alert system of claim 1, wherein the processor includes further instructions which, when executed by the processor, cause the processor to provide at least one of sounding a second audible indicator and illuminating a second light indicator when the tank reaches a predetermined fluid volume.

8. The tank volume alert system of claim 7, wherein the processor includes further instructions which, when executed by the processor, cause the processor to close a valve to close off flow to the tank when the tank is full of fluid.

9. The tank volume alert system of claim 1, wherein the audible indicator is sounded and the light indicator is illuminated when the tank will be at a desired level when a transfer hose is emptied into the tank.

10. The tank volume alert system of claim 1, wherein the processor provides the at least one of sounding an audible indicator and illuminating a light indicator when the tank level will be full when the fill hose is emptied into the tank.

11. The tank volume alert system of claim 1, further comprising an indicator package that includes two indicator lights, wherein the first of the two indicator lights illuminates yellow when the tank volume is equal to the tank volume capacity less the transfer hose volume capacity and the second of the two indicator lights illuminates red when the tank volume is equal to the tank volume capacity.

12. The tank volume alert system of claim 1, further comprising a valve situated in the fluid flow to the tank and wherein the processor instructions further cause the processor to close the valve when the tank will be at a desired level after a fill hose is emptied into the tank.

13. The tank volume alert system of claim 1, wherein the processor further receives a signal indicating a fluid volume capacity of the transfer hose.

14. The tank volume alert system of claim 1, wherein the processor further includes instructions which, when executed by the processor, cause the processor to monitor a volume of fluid placed into the tank.

15. The tank volume alert system of claim 14, wherein the processor further includes instructions which, when executed by the processor, cause the processor to provide a signal to control an amount of pressure applied to the tank based on one of the level of fluid in the tank and the volume of fluid in the tank.

16. The tank volume alert system of claim 1, wherein the processor includes instructions which, when executed by the processor, cause the processor to determine the location of the tank and a truck carrying the tank when the tank is being loaded.

17. The tank volume alert system of claim 16, wherein the processor further includes instructions which, when executed by the processor, cause the processor to prepare a document that reports a quantity of fluid moved to a tanker truck at a location.

18. The tank volume alert system of claim 1 further comprising:
    an indicator package that includes two indicator lights, wherein the first of the two indicator lights illuminates yellow when the tank volume is equal to a desired volume less the transfer hose fluid volume capacity and the second of the two indicator lights illuminates red when the tank volume is equal to the desired volume.

19. A tanker truck volume measurement system, comprising:
    a processor that includes instructions which, when executed by the processor, cause the processor to:
    receive a unique identifier for a tank in position to be filled;
    receive periodic fluid level measurements in the tank;
    correlate the level of fluid in the tank to a volume of fluid in the tank;
    determine a desired volume to be placed in the tank less the volume of a transfer hose;

provide a first illuminated light indication to a tank filling operator when the tank is less than the desired volume to be placed in the tank less the volume of the transfer hose; and provide a second illuminated light indication to the tank filling operator when the tank reaches the desired volume to be placed in the tank.

20. The tanker truck volume measurement system of claim 19, wherein:

the first indication is illumination of a first colored light;

the second indication is illumination of a second, differently colored light; and the desired volume to be placed in the tank is determined by one of a desired tank level and a desired tank volume.

* * * * *